United States Patent
Nakayama et al.

(10) Patent No.: US 9,381,967 B2
(45) Date of Patent: Jul. 5, 2016

(54) INVERTED VEHICLE AND ITS CONTROL METHOD

(71) Applicants: Takahiro Nakayama, Nagoya (JP); Yusuke Kida, Toyota (JP); Tetsuya Taira, Nisshin (JP); Hiroshi Bitoh, Toyota (JP)

(72) Inventors: Takahiro Nakayama, Nagoya (JP); Yusuke Kida, Toyota (JP); Tetsuya Taira, Nisshin (JP); Hiroshi Bitoh, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/435,665

(22) PCT Filed: Oct. 16, 2012

(86) PCT No.: PCT/JP2012/006614
§ 371 (c)(1),
(2) Date: Apr. 14, 2015

(87) PCT Pub. No.: WO2014/061057
PCT Pub. Date: Apr. 24, 2014

(65) Prior Publication Data
US 2015/0259021 A1    Sep. 17, 2015

(51) Int. Cl.
| | | |
|---|---|---|
| *G06F 17/10* | (2006.01) |
| *B62K 3/00* | (2006.01) |
| *B62K 17/00* | (2006.01) |
| *G05D 1/08* | (2006.01) |
| *G05B 9/02* | (2006.01) |
| *G05D 13/62* | (2006.01) |

(52) U.S. Cl.
CPC . *B62K 3/007* (2013.01); *B62K 3/00* (2013.01); *B62K 17/00* (2013.01); *G05B 9/02* (2013.01); *G05D 1/08* (2013.01); *G05D 13/62* (2013.01)

(58) Field of Classification Search
CPC ............ B62K 17/00; B62K 3/00; B62K 1/00; G05D 1/08
USPC .......... 701/51, 93, 97, 124; 180/65.1; 188/32; 280/14.21, 28.11, 43.14, 43.24, 652, 280/755
See application file for complete search history.

(56) References Cited

U.S. PATENT DOCUMENTS

| | | | |
|---|---|---|---|
| 6,223,104 B1 | 4/2001 | Kamen et al. |
| 6,332,103 B1 | 12/2001 | Steenson, Jr. et al. |
| 6,779,621 B2 * | 8/2004 | Kamen | B60L 15/2045 180/218 |

(Continued)

FOREIGN PATENT DOCUMENTS

| | | |
|---|---|---|
| JP | 2003-504600 A | 2/2003 |
| JP | 2003-517340 A | 5/2003 |

(Continued)

*Primary Examiner* — McDieunel Marc
(74) *Attorney, Agent, or Firm* — Kenyon & Kenyon LLP (57) ABSTRACT

An inverted vehicle comprises a first sensor that detects an angular speed around an axis inclined from a pitch axis by a first predetermined angle, a second sensor that detects an angular speed around an axis inclined from the pitch axis by a second predetermined angle, a third sensor that detects an angular speed around the pitch axis, an acceleration detection unit that detects accelerations along the axes, and a control unit that performs the inversion control based on the detected angular speeds. A control unit puts a specific safety function in motion based on a mutual relation among a first angular speed around the pitch axis calculated based on the angular speeds detected by the first and second sensors, a second angular speed around the pitch axis detected by the third sensor, and a third angular speed around the pitch axis calculated based on the detected accelerations.

9 Claims, 7 Drawing Sheets

(56) References Cited

U.S. PATENT DOCUMENTS

| | | | |
|---|---|---|---|
| 6,789,640 B1* | 9/2004 | Arling | A63C 17/12 180/218 |
| 6,827,163 B2* | 12/2004 | Amsbury | B60L 11/1851 180/218 |
| 6,866,107 B2* | 3/2005 | Heinzmann | A63C 17/12 180/218 |
| 6,874,591 B2* | 4/2005 | Morrell | A63C 17/12 180/179 |
| 7,004,271 B1* | 2/2006 | Kamen | B62D 37/00 180/21 |
| 7,546,889 B2* | 6/2009 | Kamen | B62D 37/00 180/333 |
| 8,170,780 B2* | 5/2012 | Field | B60N 2/045 152/209.27 |
| 2009/0055033 A1 | 2/2009 | Gansler et al. | |

FOREIGN PATENT DOCUMENTS

| | | |
|---|---|---|
| JP | 2009-204419 A | 9/2009 |
| JP | 2010-536649 A | 12/2010 |
| JP | 2012-068189 A | 4/2012 |
| WO | 01/02920 A1 | 1/2001 |
| WO | 2009/026195 A2 | 2/2009 |

\* cited by examiner

Fig. 7

INVERTED VEHICLE AND ITS CONTROL METHOD

CROSS-REFERENCE TO RELATED APPLICATION

This is a national phase application based on the PCT International Patent Application No. PCT/JP2012/006614 filed Oct. 16, 2012, the entire contents of both of which are incorporated herein by reference.

TECHNICAL FIELD

The present invention relates to an inverted vehicle and its control method, and in particular, to a technique for performing the inversion control of an inverted vehicle based on an angular speed detected by a sensor.

BACKGROUND ART

In inverted vehicles such as inverted two-wheeled vehicles, it is one of the important matters to be able to enable a rider to safely get off the vehicle even when an abnormality occurs in the system. An inverted vehicle performs inversion control based on an output(s) from a sensor(s). Therefore, it is very important to detect a failure in a sensor and a failed sensor with high accuracy and to prevent inversion control based on the output from the failed sensor in order to secure the safety.

Patent literature 1 discloses a vehicle in which a power base in which a power supply, a sensor electronics board, and a control processor are integrated as one combination unit is constructed with triple redundancy. This vehicle detects a failure in a sensor by comparing data supplied from triple-redundancy sensors with each other.

However, when a plurality of sensors each having the same configuration are simply constructed in a redundant manner as in the case of the vehicle disclosed in Patent literature 1, there is a problem that the cost increases. For example, assume a case where a gyro-sensor is installed for each of three orthogonal axes in order to detect an angular speed around each of the three orthogonal axes in the sensor electronics board. In such a case, since the sensor electronics board is constructed with triple redundancy, nine (3×3) gyro-sensors are necessary in total. That is, there is a problem that the cost increases. Incidentally, Patent literature 2 discloses an inertia reference apparatus that calculates angular speeds around three orthogonal axes from angular speeds measured by four gyroscopes that are obliquely disposed with respect to each other.

CITATION LIST

Patent Literature

Patent literature 1: Published Japanese Translation of PCT International Publication for Patent Application, No. 2003-517340
Patent literature 2: Japanese Unexamined Patent Application Publication No. 2009-204419

SUMMARY OF INVENTION

Technical Problem

The present invention has been made in view of the above-described knowledge, and an object thereof is to provide an inverted vehicle and its control method, capable of reducing the cost without lowering the failure detection accuracy.

Solution to Problem

An inverted vehicle according to a first aspect of the present invention is an inverted vehicle for which inversion control is performed, including: a first sensor that detects an angular speed around an axis inclined from a pitch axis of the inverted vehicle by a first predetermined angle on a plane perpendicular to a yaw axis of the inverted vehicle; a second sensor that detects an angular speed around an axis inclined from the pitch axis of the inverted vehicle by a second predetermined angle on the plane perpendicular to the yaw axis of the inverted vehicle; a third sensor that detects an angular speed around the pitch axis of the inverted vehicle; a pitch-axis acceleration detection unit that detects an acceleration along the pitch axis of the inverted vehicle; a roll-axis acceleration detection unit that detects an acceleration along a roll axis of the inverted vehicle; a yaw-axis acceleration detection unit that detects an acceleration along the yaw axis of the inverted vehicle; and a control unit that performs the inversion control based on the angular speeds detected by the first sensor, the second sensor, and the third sensor respectively, in which the control unit puts a specific safety function in motion based on a mutual relation among a first angular speed around the pitch axis of the inverted vehicle calculated based on the angular speeds detected by the first sensor and the second sensor respectively, a second angular speed around the pitch axis of the inverted vehicle detected by the third sensor, and a third angular speed around the pitch axis of the inverted vehicle calculated based on the accelerations detected by the pitch-axis acceleration detection unit, the roll-axis acceleration detection unit, the yaw-axis acceleration detection unit respectively.

A control method according to a second aspect of the present invention is a control method for performing inversion control based on angular speeds detected by a first sensor, a second sensor, and a third sensor respectively, the first sensor being configured to detect an angular speed around an axis inclined from a pitch axis of an inverted vehicle by a first predetermined angle on a plane perpendicular to a yaw axis of the inverted vehicle, the second sensor being configured to detect an angular speed around an axis inclined from the pitch axis of the inverted vehicle by a second predetermined angle on the plane perpendicular to the yaw axis of the inverted vehicle, and the third sensor being configured to detect an angular speed around the pitch axis of the inverted vehicle, the control method including: detecting an acceleration along the pitch axis of the inverted vehicle, an acceleration along a roll axis of the inverted vehicle, and an acceleration along the yaw axis of the inverted vehicle; and putting a specific safety function in motion based on a mutual relation among a first angular speed around the pitch axis of the inverted vehicle calculated based on the angular speeds detected by the first sensor and the second sensor respectively, a second angular speed around the pitch axis of the inverted vehicle detected by the third sensor, and a third angular speed around the pitch axis of the inverted vehicle calculated based on the detected accelerations along the pitch axis, the roll axis, and the yaw axis, respectively, of the inverted vehicle.

Advantageous Effects of Invention

According to each of the above-described aspects of the present invention, it is possible to provide an inverted vehicle and its control method, capable of reducing the cost without lowering the failure detection accuracy.

DESCRIPTION OF EMBODIMENTS

Figure 1:
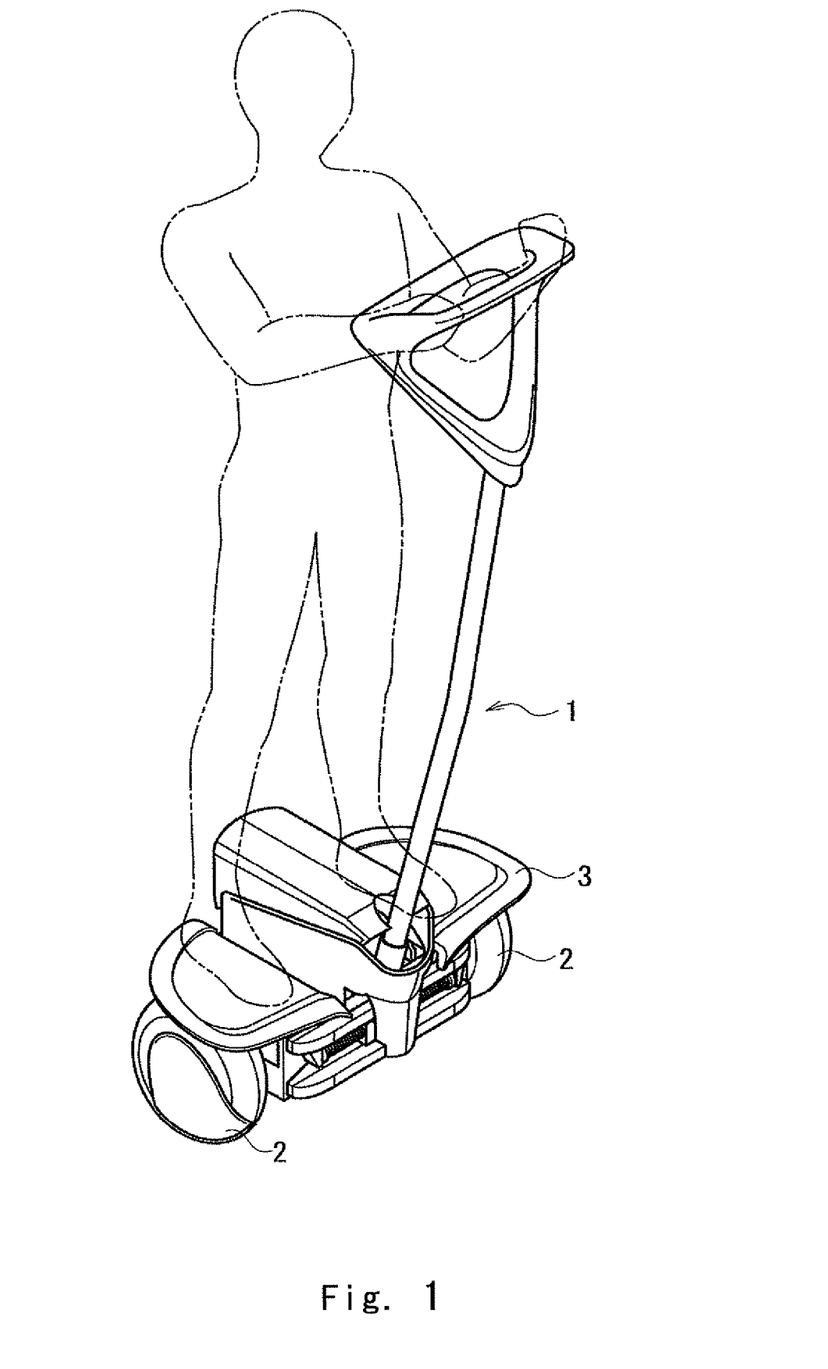
FIG. 1 shows an overview configuration of an inverted two-wheeled vehicle according to an exemplary embodiment.

An inverted two-wheeled vehicle 1 according to an exemplary embodiment of the present invention is explained with reference to FIG. 1. FIG. 1 shows a general configuration of an inverted two-wheeled vehicle 1 according to an exemplary embodiment of the present invention.

The inverted two-wheeled vehicle 1 detects the posture angle of the inverted two-wheeled vehicle 1 in the front-back direction (pitch angle) that is caused when a rider on step plates 3 exerts a load in the front-back direction of the inverted two-wheeled vehicle 1, by using a sensor(s), and controls motors that drive the left and right wheels 2 so that the inverted state of the inverted two-wheeled vehicle 1 is maintained. That is, the inverted two-wheeled vehicle 1 controls the motors that drive the left and right wheels 2 in such a manner that when the rider on the step plates 3 exerts a load forward and thereby inclines the inverted two-wheeled vehicle 1 forward, the inverted two-wheeled vehicle 1 accelerates forward so as to maintain the inverted state of the inverted two-wheeled vehicle 1. Further, the inverted two-wheeled vehicle 1 controls the motors so that when the rider exerts a load backward and thereby inclines the inverted two-wheeled vehicle 1 backward, the inverted two-wheeled vehicle 1 accelerates backward so as to maintain the inverted state of the inverted two-wheeled vehicle 1. In the inverted two-wheeled vehicle 1, the control system that controls the motors is constructed with dual-redundancy in order to ensure the control safety.

Note that the above-described motor control is performed by a control apparatus 10 installed in the inverted two-wheeled vehicle 1. Next, the control apparatus 10 is explained with reference to FIG. 2.

Figure 2:
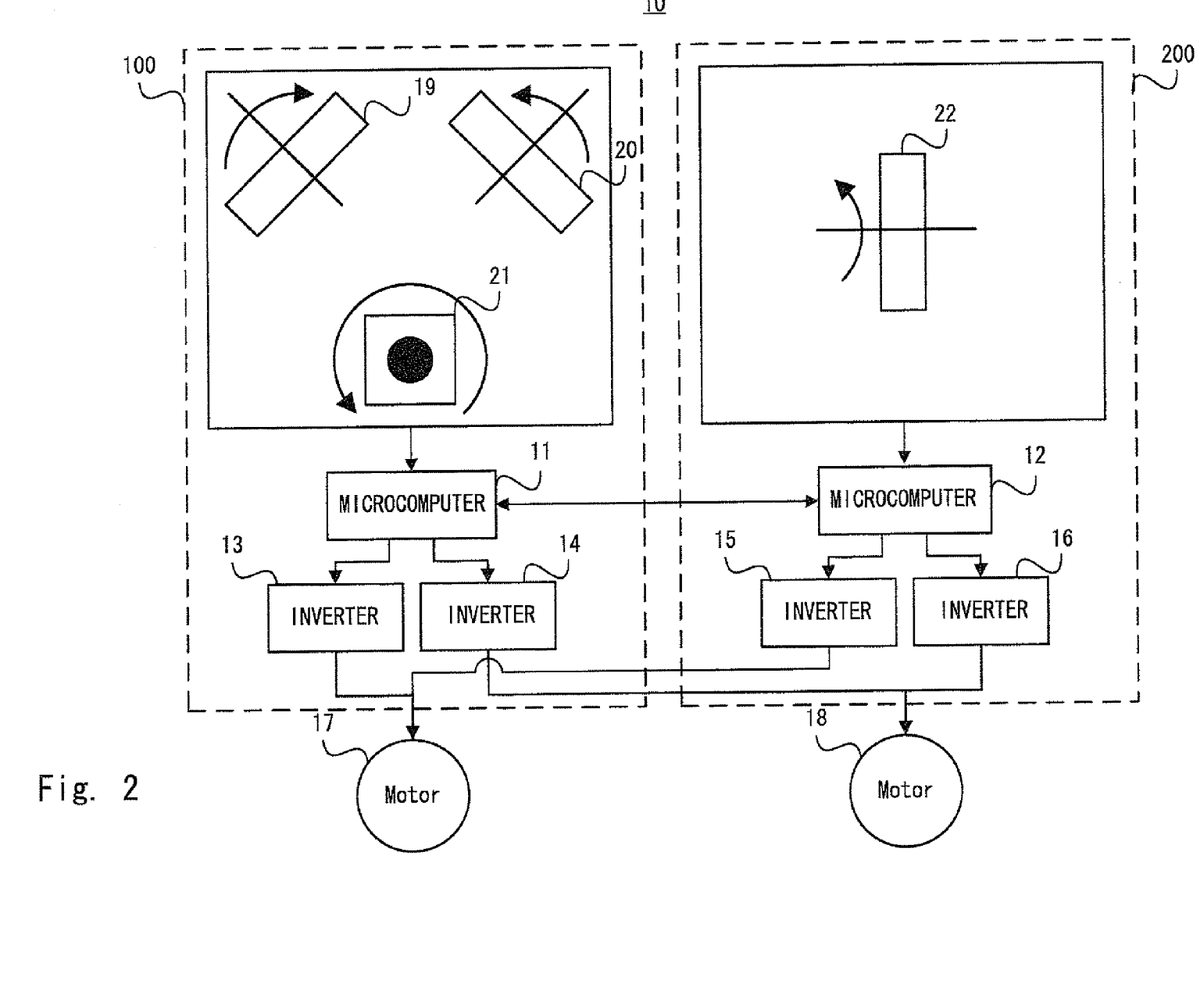
FIG. 2 is a block diagram showing a configuration of a control apparatus according to an exemplary embodiment.

Next, a configuration of a control apparatus 10 according to an exemplary embodiment of the present invention is explained with reference to FIG. 2. FIG. 2 is a block diagram showing a configuration of a control apparatus 10 according to an exemplary embodiment of the present invention.

The control apparatus 10 includes microcontrollers 11 and 12 (hereinafter also called "microcomputer"), inverters 13 to 16, motors 17 and 18, and sensors 19 to 22.

The control apparatus 10 is constructed as a dual-redundant system having dual-redundancy including a 1-series system 100 and a 2-series system 200 in order to ensure the control safety of the inverted two-wheeled vehicle 1. That is, the inverted two-wheeled vehicle 1 is controlled by both of the systems 100 and 200 in the normal state. When an abnormality is detected in one of the systems, the inverted two-wheeled vehicle 1 is controlled by the other system so that the inverted two-wheeled vehicle 1 is stopped safely. The 1-series system 100 includes the microcomputer 11, the inverters 13 and 14, and the sensors 19 to 21. The 2-series system 200 includes the microcomputer 12, the inverters 15 and 16, and the sensor 22.

In the following explanation, the roll axis, the pitch axis, and the yaw axis of the inverted two-wheeled vehicle 1 are also called "X-axis", "Y-axis", and "Z-axis" respectively. In the 1-series system 100, the sensors 19 and 20 are arranged so as to be opposed to each other while their detection axes form angles of 45° with respect to the pitch axis and the roll axis respectively on a plane perpendicular to the yaw axis. That is, the sensors 19 and 20 are arranged so that their detection axes are inclined from the pitch axis by 45° in different directions in a symmetric manner with respect to the pitch axis. Further, the sensor 21 is disposed so that its detection axis coincides with the yaw axis in the 1-series system 100. In the 2-series system 200, the sensor 22 is disposed so that its detection axis coincides with the pitch axis.

The microcomputers 11 and 12 are ECUs (Engine Control Units) that control the motors 17 and 18 based on angular speed signals output from the sensors 19 to 21 and the sensor 22 respectively so that the inverted two-wheeled vehicle 1 maintains the inverted state as described above. Each of the microcomputers 11 and 12 includes a CPU (Central Processing Unit) and a storage unit, and performs a process as a respective one of the microcomputers 11 and 12 in this exemplary embodiment by executing a program stored in the storage unit. That is, a program stored in the storage unit of each of the microcomputers 11 and 12 includes code for causing the CPU to execute a process as a respective one of the microcomputers 11 and 12 in this exemplary embodiment. Note that the storage unit includes an arbitrary storage device capable of storing this program and various information items used for processes performed in the CPU. For example, the storage device is a memory or the like.

The microcomputer 11 generates a command value for controlling the motor 17 and outputs the generated command value to the inverter 13. Further, the microcomputer 11 generates a command value for controlling the motor 18 and outputs the generated command value to the inverter 14. Note that the microcomputer 11 calculates the posture angle of the inverted two-wheeled vehicle 1 based on angular speed signals output from the sensors 19 and 20, and generates command values for controlling the motors 17 and 18 based on the calculated posture angle so that the inverted state of the inverted two-wheeled vehicle 1 is maintained.

Specifically, the microcomputer 11 calculates an angular speed around the pitch axis from angular speeds indicated by angular speed signals output from the sensors 19 and 20 respectively. The microcomputer 11 calculates the posture angle in the front-back direction (pitch angle) of the inverted two-wheeled vehicle 1 by integrating the calculated angular speed around the pitch axis, and generates command values for controlling the motors 17 and 18 based on the calculated posture angle (pitch angle) so that the inverted state of the inverted two-wheeled vehicle 1 is maintained. Note that the angular speeds indicated by the angular speed signals output from the sensors 19 and 20 respectively are angular speeds around the axes that are inclined from the pitch axis by 45° as described above. Therefore, as described later, the microcomputer 11 calculates an angular speed around the pitch axis by performing rotating matrix calculation for those angular speeds, and calculates the posture angle in the front-back direction (pitch angle) of the inverted two-wheeled vehicle 1 based on the calculated angular speed around the pitch axis.

Further, the microcomputer 11 calculates an angular speed around the roll axis from angular speeds indicated by angular speed signals output from the sensors 19 and 20 respectively. The microcomputer 11 calculates the posture angle in the left-right direction (roll angle) of the inverted two-wheeled vehicle 1 by integrating the calculated angular speed around the roll axis, and generates command values for controlling the motors 17 and 18 based on the calculated posture angle (roll angle) so that the inverted two-wheeled vehicle 1 turns. Note that the angular speeds indicated by the angular speed signals output from the sensors 19 and 20 respectively are also angular speeds around the axes that are inclined from the roll axis by 45°. Therefore, as described later, the microcomputer 11 calculates an angular speed around the roll axis by performing rotating matrix calculation for those angular speeds, and calculates the posture angle in the left-right direction (roll angle) of the inverted two-wheeled vehicle 1 based on the calculated angular speed around the roll axis.

Further, the microcomputer 11 may perform arbitrary control for the inverted two-wheeled vehicle 1 based on an angular speed around the yaw axis indicated by an angular speed signal output from the sensor 21. For example, in order to prevent any abrupt turning action of the inverted two-wheeled vehicle 1, when the microcomputer 11 determines that the angular speed indicated by the angular speed signal output from the sensor 21 is greater than a predetermined angular speed, the microcomputer 11 may generate command values for controlling the motors 17 and 18 so that the inverted two-wheeled vehicle 1 does not turns at an angular speed greater than the current angular speed.

The microcomputer 12 generates a command value for controlling the motor 17 and outputs the generated command value to the inverter 15. Further, the microcomputer 12 generates a command value for controlling the motor 18 and outputs the generated command value to the inverter 16. Note that the microcomputer 12 calculates the posture angle of the inverted two-wheeled vehicle 1 based on an angular speed signal output from the sensor 22, and generates command values for controlling the motors 17 and 18 based on the calculated posture angle so that the inverted state of the inverted two-wheeled vehicle 1 is maintained.

Specifically, the microcomputer 11 calculates the posture angle in the front-back direction (pitch angle) of the inverted two-wheeled vehicle 1 by integrating an angular speed around the pitch axis indicated by the angular speed signal output from the sensor 22, and generates command values for controlling the motors 17 and 18 based on the calculated posture angle (pitch angle) so that the inverted state of the inverted two-wheeled vehicle 1 is maintained.

The inverter 13 performs PWM (Pulse Width Modulation) control based on the command value output from the microcomputer 11 and thereby generates a driving current for performing motor control according to the command value, and supplies the generated driving current to the motor 17. The inverter 14 performs PWM control based on the command value output from the microcomputer 11 and thereby generates a driving current for performing motor control according to the command value, and supplies the generated driving current to the motor 18. The inverter 15 performs PWM control based on the command value output from the microcomputer 12 and thereby generates a driving current for performing motor control according to the command value, and supplies the generated driving current to the motor 17. The inverter 16 performs PWM control based on the command value output from the microcomputer 12 and thereby generates a driving current for performing motor control according to the command value, and supplies the generated driving current to the motor 18.

Each of the motors 17 and 18 is a double-winding motor. The motor 17 is driven based on the driving current supplied from the inverter 13 and the driving current supplied from the inverter 15. By driving the motor 17, the left-side wheel 2 of the inverted two-wheeled vehicle 1 is rotated. The motor 18 is driven based on the driving current supplied from the inverter 14 and the driving current supplied from the inverter 16. By driving the motor 18, the right-side wheel 2 of the inverted two-wheeled vehicle 1 is rotated.

Figure 3:
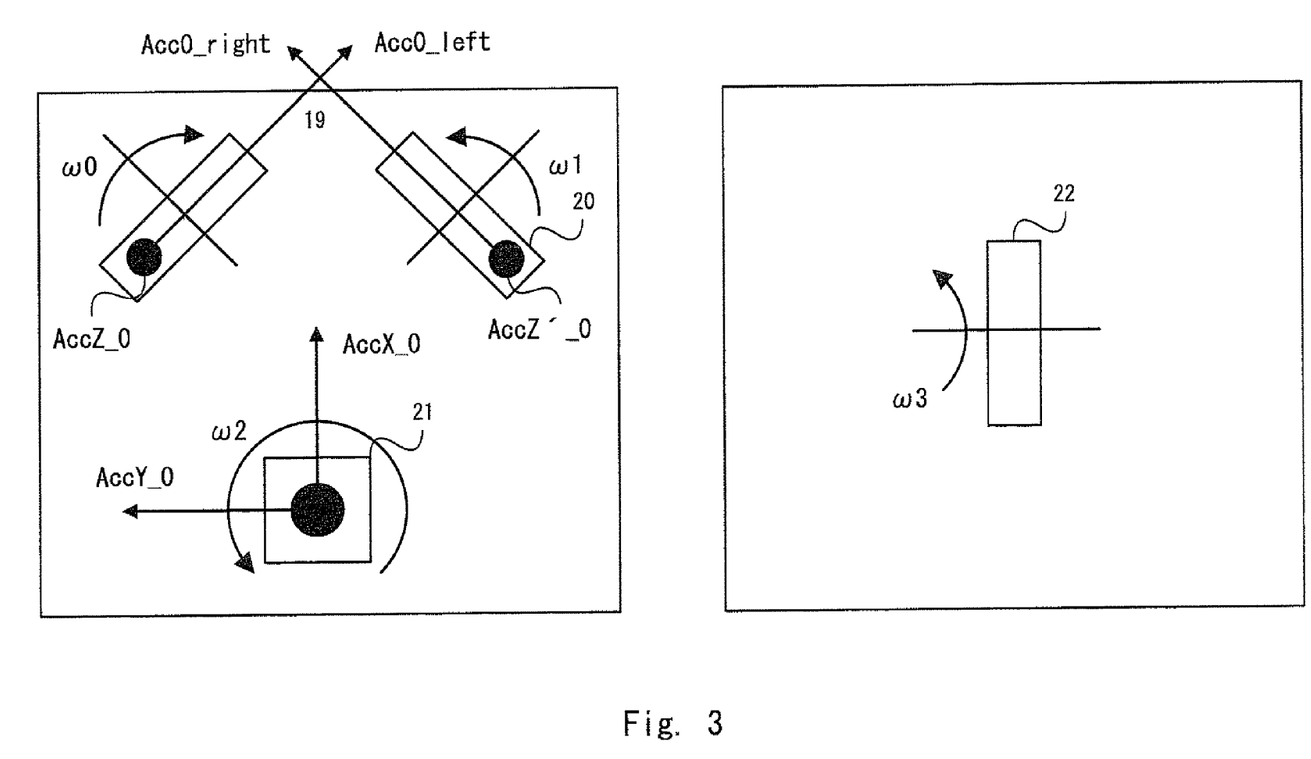
FIG. 3 shows angular speeds and accelerations detected by sensors according to an exemplary embodiment.

Next, each of the sensors 19 to 22 is explained with reference to FIG. 3. FIG. 3 shows angular speeds and accelerations detected by the respective sensors 19 to 22. Note that each of the sensors 19 to 21 includes a compound-type sensor chip capable of detecting an angular speed around one axis and accelerations along two axes. That is, each of the sensors 19 to 21 functions as both a gyro-sensor and an acceleration sensor. Further, the sensor 22 is a sensor chip capable of detecting an angular speed around one axis. That is, the sensor 22 functions as a gyro-sensor.

As described above, the sensor 19 detects an angular speed $\omega 0$ around an axis inclined from each of the pitch axis and the roll axis by 45°, generates an angular speed signal indicating the detected angular speed $\omega 0$, and outputs the generated angular speed signal to the microcomputer 11. Further, the sensor 19 detects an acceleration Acc_left along an axis inclined from each of the pitch axis and the roll axis by 45°, generates an inclined-axis acceleration signal indicating the detected acceleration Acc_left, and outputs the generated inclined-axis acceleration signal to the microcomputer 11. The detection axis for the angular speed $\omega 0$ and the detection axis for the acceleration Acc_left are arranged so as to intersect each other at right angles. Further, the sensor 19 detects an acceleration AccZ_0 along the Z-axis, generates a Z-axis acceleration signal indicating the detected acceleration AccZ_0, and outputs the generated Z-axis acceleration signal to the microcomputer 11.

As described above, the sensor 20 detects an angular speed $\omega 1$ around an axis inclined from each of the pitch axis and the roll axis by 45°, generates an angular speed signal indicating the detected angular speed $\omega 1$, and outputs the generated angular speed signal to the microcomputer 11. Further, the sensor 20 detects an acceleration Acc_right along an axis inclined from each of the pitch axis and the roll axis by 45°, generates an inclined-axis acceleration signal indicating the detected acceleration Acc_right, and outputs the generated inclined-axis acceleration signal to the microcomputer 11. The detection axis for the angular speed $\omega 1$ and the detection axis for the acceleration Acc_right are arranged so as to intersect each other at right angles. That is, the detection axis for the angular speed $\omega 0$ is the same axis as the detection axis for the acceleration Acc_right. Further, the detection axis for the angular speed $\omega 1$ is the same axis as the detection axis for the acceleration Acc_left. Further, the sensor 20 detects an acceleration AccZ'_0 along the Z-axis, generates a Z-axis acceleration signal indicating the detected acceleration AccZ_0, and outputs the generated Z-axis acceleration signal to the microcomputer 11.

The sensor 21 detects an angular speed $\omega 2$ around the yaw axis, generates an angular speed signal indicating the detected angular speed $\omega 2$, and outputs the generated angular speed signal to the microcomputer 11. Further, the sensor 21 detects an acceleration AccX_0 in the X-direction, generates an X-axis acceleration signal indicating the detected acceleration AccX_0, and outputs the generated X-axis acceleration signal to the microcomputer 11. Further, the sensor 21 detects an acceleration AccY_0 in the Y-axis direction, generates a Y-axis acceleration signal indicating the detected acceleration AccY_0, and outputs the generated Y-axis acceleration signal to the microcomputer 11.

The sensor 22 detects an angular speed ω3 around the pitch axis, generates an angular speed signal indicating the detected angular speed ω3, and outputs the generated angular speed signal to the microcomputer 12.

Figure 4:
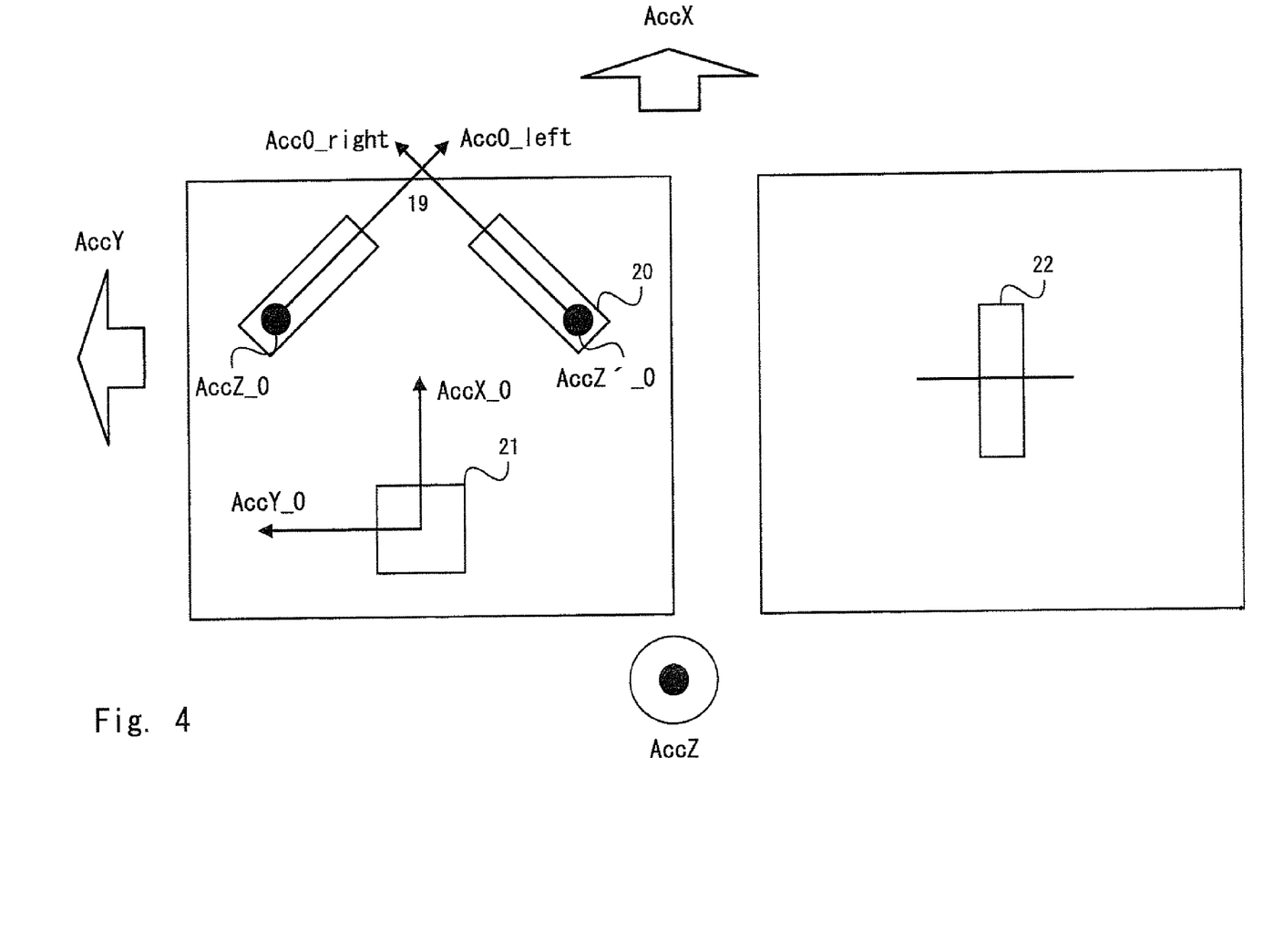
FIG. 4 shows accelerations along the X-axis, Y-axis, and Z-axis that are detected/calculated in an exemplary embodiment.

Next, a method for calculating an acceleration in each of the X-axis, Y-axis, and Z-axis is explained with reference to FIG. 4. FIG. 4 shows accelerations along the X-axis, Y-axis, and Z-axis that are detected/calculated in this exemplary embodiment.

As described above, the two acceleration detection axes of the sensor 21 coincide with the X-axis and Y-axis respectively. Further, the one acceleration detection axis of each of the sensors 19 and 20 coincides with the Z-axis. Therefore, as shown in Expressions (1) to (3), the microcomputer 11 defines the accelerations AccX and AccY along the X-axis and Y-axis as the accelerations AccX_0 and AccY_0 along the X-axis and Y-axis, respectively, detected by the sensor 21, and defines the acceleration AccZ along the Z-axis as the acceleration AccZ_0 along the Z-axis detected by the sensor 19 or the acceleration AccZ'_0 along the Z-axis detected by the sensor 20. Note that an example in which the acceleration AccZ_0 along the Z-axis detected by the sensor 19 is used as the acceleration AccZ along the Z-axis is explained in this exemplary embodiment.

[Expression 1]

$$AccX = AccX\_0 \quad (1)$$

$$AccY = AccY\_0 \quad (2)$$

$$AccZ = AccZ\_0 \quad (1)$$

That is, as shown in Expression (1), the microcomputer 11 uses the acceleration AccX_0 along the X-axis indicated by X-axis acceleration information output from the sensor 21 as the accelerations AccX along the X-axis. Further, as shown in Expression (2), the microcomputer 11 uses the acceleration AccY_0 along the Y-axis indicated by Y-axis acceleration information output from the sensor 21 as the accelerations AccY along the Y-axis. Further, as shown in Expression (3), the microcomputer 11 uses the acceleration AccZ_0 along the Z-axis indicated by Z-axis acceleration information output from the sensor 19 as the accelerations AccZ along the Z-axis.

Further, as described later, the microcomputer 11 also calculates accelerations AccX'_0 and AccY'_0 that are used for a comparison for detecting a failure relating to the acceleration detection performed by the sensors 19 to 21. Note that as described above, the one acceleration detection axis of each of the sensors 19 and 20 forms angles of 45° with respect to both of the pitch axis and the roll axis. Therefore, as shown in Expression (4), the microcomputer 11 calculates the acceleration AccX'_0 along the X-axis by combining the respective X-axis components of the accelerations Acc_left and Acc_right detected by the sensors 19 and 20 respectively.

[Expression 2]

$$AccX'\_0 = \frac{1}{\sqrt{2}}(Acc0\_left + Acc0\_right) \quad (4)$$

Specifically, as shown in Expression (4), the angular speed AccX'_0 along the X-axis is calculated by dividing the total value (addition value) of the acceleration Acc0_left detected by the sensor 19 and the acceleration Acc0_right detected by the sensor 20 by the square root of two. That is, the microcomputer 11 calculates the angular speed AccX'_0 along the X-axis by dividing the total value of the acceleration Acc0_left indicated by inclined-axis acceleration information output from the sensor 19 and the acceleration Acc0_right indicated by inclined-axis acceleration information output from the sensor 20 by the square root of two.

Further, as shown in Expression (5), the microcomputer 11 calculates the acceleration AccY'_0 in the Y-axis direction by combining the respective Y-axis components of the accelerations Acc_left and Acc_right detected by the sensors 19 and 20 respectively.

[Expression 3]

$$AccY'\_0 = \frac{1}{\sqrt{2}}(-Acc0\_left + Acc0\_right) \quad (5)$$

Specifically, as shown in Expression (5), the angular speed AccY'_0 along the Y-axis is calculated by dividing the difference value (subtraction value) between the acceleration Acc0_left detected by the sensor 19 and the acceleration Acc0_right detected by the sensor 20 by the square root of two. That is, the microcomputer 11 calculates the angular speed AccY'_0 along the Y-axis by dividing the difference value between the acceleration Acc0_left indicated by inclined-axis acceleration information output from the sensor 19 and the acceleration Acc0_right indicated by inclined-axis acceleration information output from the sensor 20 by the square root of two.

Figure 5:
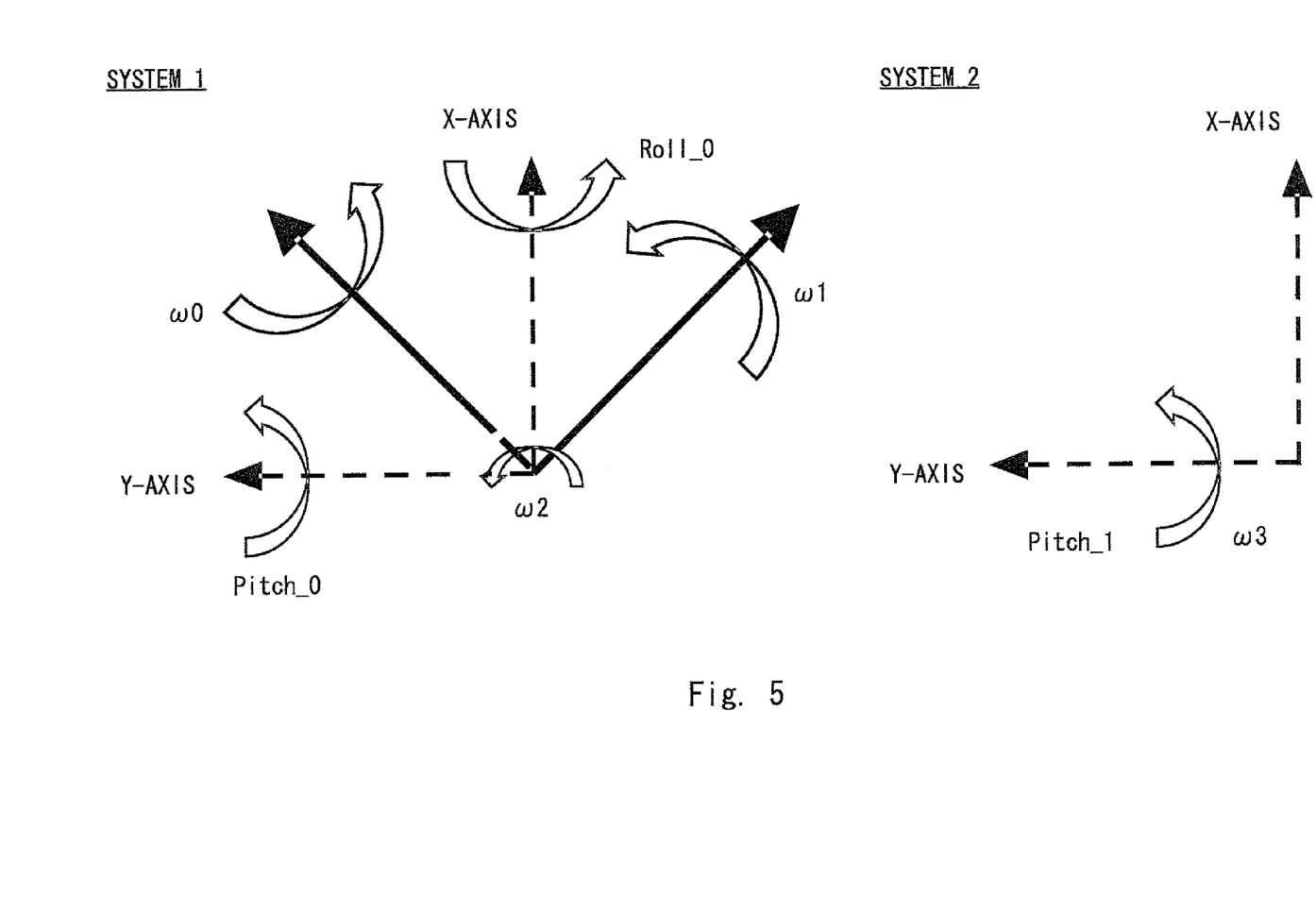
FIG. 5 shows angular speeds detected/calculated in an exemplary embodiment.

Next, a method for calculating angular speeds in the roll axis and the pitch axis is explained with reference to FIG. 5. FIG. 5 shows angular speeds detected/calculated in this exemplary embodiment.

As described above, the angular speed detection axis of each of the sensors 19 and 20 in the 1-series system 100 forms angles of 45° with respect to both of the pitch axis and the roll axis. Therefore, as shown in Expression (6), the microcomputer 11 calculates the angular speed Roll_0 around the roll axis by combining the respective roll axis components of the angular speeds ω0 and ω1 detected by the sensors 19 and 20 respectively.

[Expression 4]

$$Roll\_0 = \frac{1}{\sqrt{2}}(\omega_0 - \omega_1) \quad (6)$$

Specifically, as shown in Expression (6), the angular speed Roll_0 around the roll axis detected in the 1-series system 100 is calculated by dividing the difference value (subtraction value) between the angular speed ω0 detected by the sensor 19 and the angular speed ω1 detected by the sensor 20 by the square root of two. That is, the microcomputer 11 calculates the angular speed Roll_0 around the roll axis by dividing the difference value between the angular speed ω0 indicated by angular speed information output from the sensor 19 and the angular speed ω1 indicated by angular speed information output from the sensor 20 by the square root of two.

Further, as shown in Expression (7), the microcomputer 11 calculates the angular speed Pitch_0 around the pitch axis by combining the respective pitch axis components of the angular speeds ω0 and ω1 detected by the sensors 19 and 20 respectively.

[Expression 5]

$$\text{Pitch\_0} = \frac{1}{\sqrt{2}}(\omega_0 + \omega_1) \qquad (7)$$

Specifically, as shown in Expression (7), the angular speed Pitch_0 around the pitch axis detected in the 1-series system 100 is calculated by dividing the total value (addition value) of the angular speed ω0 detected by the sensor 19 and the angular speed ω1 detected by the sensor 20 by the square root of two. That is, the microcomputer 11 calculates the angular speed Pitch_0 around the pitch axis by dividing the total value of the angular speed ω0 indicated by angular speed information output from the sensor 19 and the angular speed ω1 indicated by angular speed information output from the sensor 20 by the square root of two.

As describe above, the angular speed detection axis of the sensor 22 in the 2-series system 200 coincides with the pitch axis. Therefore, as shown in Expression (8), the microcomputer 11 defines the angular speed Pitch_1 around the pitch axis as the angular speed ω3 detected by the sensor 22.

[Expression 6]

$$\text{Pitch\_1} = \omega_3 \qquad (8)$$

That is, as shown in Expression (8), the microcomputer 11 defines the angular speed Pitch_1 around the pitch axis detected in the 2-series system 200 as the angular speed ω3 indicated by angular speed information output from the sensor 22.

Further, as described later, the microcomputer 11 also calculates an angular speed Pitch_Acc that is used for a comparison for detecting a failure relating to the angular speed detection performed by the sensors 19, 20 and 22. As shown in Expression (9), the microcomputer 11 calculates the angular speed Pitch_Acc around the pitch axis in an approximate manner based on accelerations AccX, AccY and AccZ around the X-axis, Y-axis, and Z-axis.

[Expression 7]

$$\text{Pitch\_Acc} = -\arcsin(\text{AccX}/\sqrt{\text{AccX}^2 + \text{AccY}^2 + \text{AccZ}^2}) \qquad (9)$$

Specifically, as shown in Expression (9), the microcomputer 11 calculates, as the angular speed Pitch_Acc around the pitch axis, the arcsine of a value that is obtained by dividing the acceleration AccX along the X-axis by the square root of the total value of the square of the acceleration AccX along the X-axis, the square of the acceleration AccY along the Y-axis, and the square of the acceleration AccZ along the Z-axis.

In this exemplary embodiment, a failure in a sensor relating to the detection of an angular speed around the pitch axis is detected and a failed sensor is identified based on the angular speeds Pitch_0, Pitch_1 and Pitch_Acc around the pitch axis that are obtained in the above-described manner. As described above, a verification is performed in a supplementary manner by using the angular speed Pitch_Acc around the pitch axis obtained based on an acceleration in addition to the angular speeds Pitch_0 and Pitch_1 around the pitch axis obtained based on angular speeds detected by the sensors 19, 20 and 22, and thereby making it possible to improve the accuracy in identifying a failed sensor.

Figure 6:
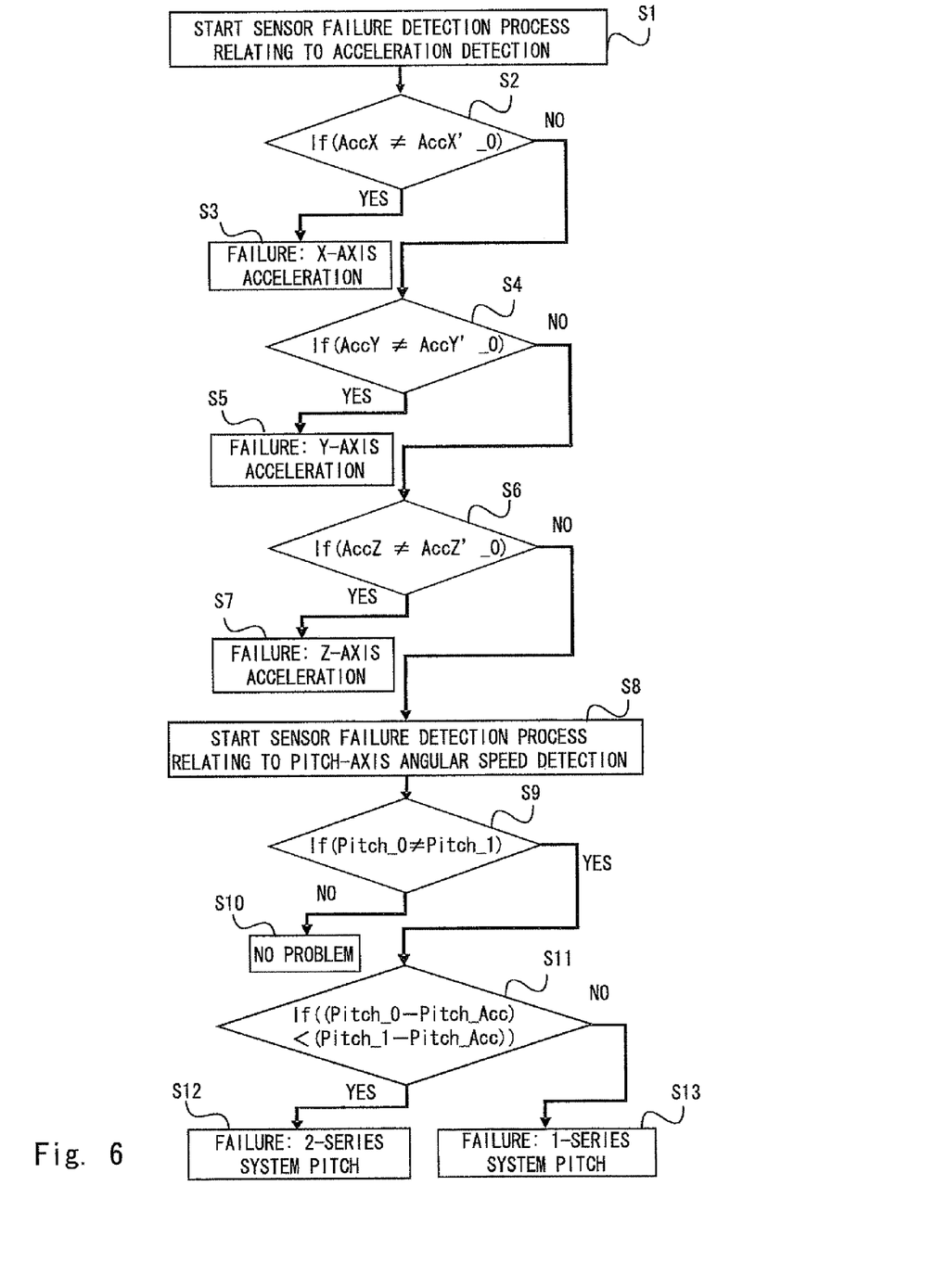
FIG. 6 is a flowchart showing a sensor failure detection process according to an exemplary embodiment.

Next, a sensor failure detection process for a control apparatus 10 according to an exemplary embodiment of the present invention is explained with reference to FIG. 6. FIG. 6 is a flowchart showing a sensor failure detection process for a control apparatus 10 according to an exemplary embodiment of the present invention.

In sensor failure detection in this exemplary embodiment, the angular speed Pitch_Acc around the pitch axis obtained based on an acceleration is also used as described above. Therefore, firstly, the microcomputer 11 starts a process for detecting a failure in a sensor relating to the detection of an acceleration (S1) before determining a failure in a sensor relating to the detection of an angular speed around the pitch axis by using the angular speed Pitch_Acc around the pitch axis.

The microcomputer 11 calculates an acceleration AccX'_0 along the X-axis based on accelerations Acc0_left and Acc0_right indicated by inclined-axis acceleration information pieces output from the sensors 19 and 20 respectively. Then, the microcomputer 11 compares an acceleration AccX along the X-axis indicated by X-axis acceleration information output from the sensor 21 with the calculated acceleration AccX'_0 along the X-axis, and thereby determines whether or not the acceleration AccX coincides with the acceleration AccX'_0 within a predetermined range (S2). Note that the expression "to coincide within a predetermined range" may means that the values completely coincide with each other, or means that the values are different by a small quantity but the difference is less than a predetermined value (including complete coincidence).

When it is determined that the accelerations AccX and AccX'_0 do not coincide with each other within the predetermined range (S2: Yes), it is determined that a failure that makes the correct detection of an acceleration along one of the axes inclined from the pitch axis by 45° or along the X-axis impossible has occurred in the sensor 19 or 20, or in the sensor 21 (S3). In this case, the microcomputer 11 puts a predetermined safety function(s) according to the abnormality relating to the acceleration detection in motion for the inverted two-wheeled vehicle 1. For example, the microcomputers 11 and 12 perform braking control so that the inverted two-wheeled vehicle 1 is stopped. Specifically, the microcomputer 11 outputs a signal for notifying the sensor failure to the microcomputer 12, generates a command value(s) for stopping the inverted two-wheeled vehicle 1 in cooperation with the microcomputer 12, which has received that signal, and outputs the generated command value(s) to the inverters 13 and 14. Further, the microcomputers 11 and 12 may provide a warning by emitting an alarm sound and/or perform braining control by applying a physical brake.

When it is determined that the accelerations AccX and AccX'_0 coincide with each other within the predetermined range (S2: No), the microcomputer 11 calculates an acceleration AccY'_0 along the Y-axis based on the accelerations Acc0_left and Acc0_right indicated by the inclined-axis acceleration information pieces output from the sensors 19 and 20 respectively. Then, the microcomputer 11 compares an acceleration AccY along the Y-axis indicated by Y-axis acceleration information output from the sensor 21 with the calculated acceleration AccY'_0 along the Y-axis, and thereby determines whether or not the acceleration AccY coincides with the acceleration AccY'_0 within a predetermined range (S4).

When it is determined that the accelerations AccY and AccY'_0 do not coincide with each other within the predetermined range (S3: Yes), it is determined that a failure that makes the correct detection of an acceleration along one of the axes inclined from the pitch axis by 45° or along the Y-axis impossible has occurred in the sensor 19 or 20, or the sensor 21 (S5). In this case, the microcomputer 11 puts a predetermined safety function(s) according to the abnormality relating to the acceleration detection in motion for the inverted two-wheeled vehicle 1. For example, the microcomputer 11 stops the inverted two-wheeled vehicle 1 as described above.

When it is determined that the accelerations AccY and AccY'_0 coincide with each other within the predetermined range (S4: No), the microcomputer 11 compares an acceleration AccZ along the Z-axis indicated by Z-axis acceleration information output from the sensor 19 with an acceleration AccZ'_0 along the Z-axis indicated by Z-axis acceleration information output from the sensor 20, and thereby determines whether or not the acceleration AccZ coincides with the acceleration AccZ'_0 within a predetermined range (S6).

When it is determined that the accelerations AccZ and AccZ'_0 do not coincide with each other within the predetermined range (S6: Yes), it is determined that a failure that makes the correct detection of an acceleration in the Z-axis direction impossible has occurred in the sensor 19 or 20 (S7). In this case, the microcomputer 11 puts a predetermined safety function(s) according to the abnormality relating to the acceleration detection in motion for the inverted two-wheeled vehicle 1. For example, the microcomputer 11 stops the inverted two-wheeled vehicle 1 as described above.

When it is determined that the accelerations AccZ and AccZ'_0 coincide with each other within the predetermined range (S6: No), it is determined that the acceleration detection by the sensors 19 to 21 is performed properly. Therefore, the microcomputer 11 starts a process for detecting a sensor failure relating the detection of an angular speed around the pitch axis (S8).

The microcomputer 11 calculates an angular speed Pitch_0 around the pitch axis based on angular speeds ω0 and ω1 indicated by angular speed information pieces output from the sensors 19 and 20 respectively. Further, the microcomputer 12 outputs angular speed information output from the sensor 22, to the microcomputer 11. The microcomputer 11 compares the calculated angular speed Pitch_0 around the pitch axis with an angular speed Pitch_1 around the pitch axis indicated by the angular speed information output from the microcomputer 12, and thereby determines whether or not the angular speed Pitch_0 coincides with the angular speed Pitch_1 within a predetermined range (S9).

When it is determined that the angular speeds Pitch_0 and Pitch_1 coincide with each other within the predetermined range (S9: No), it means that the angular speed detection is correctly performed in the sensors 19 and 20, and that correct angular speeds Pitch_0 and Pitch_1 around the pitch axis are obtained (S10). Therefore, both of the microcomputers 11 and 12 maintain the inversion control of the inverted two-wheeled vehicle 1. That is, the microcomputer 11 generates a command value based on the calculated angular speed Pitch_0 around the pitch axis and outputs the generated command value to the inverters 13 and 14 so that the inverted state of the inverted two-wheeled vehicle 1 is maintained. Further, the microcomputer 12 generates a command value based on the angular speed Pitch_1 around the pitch axis indicated by the angular speed information output from the sensor 22 and outputs the generated command value to the inverters 15 and 16 so that the inverted state of the inverted two-wheeled vehicle 1 is maintained. In this way, the microcomputers 11 and 12 perform the inversion control of the inverted two-wheeled vehicle 1.

When it is determined that the angular speeds Pitch_0 and Pitch_1 do not coincide with each other within the predetermined range (S9: Yes), it is determined that there is a possibility that a failure that makes the correct detection of an angular speed around the axis inclined from the pitch axis by 45° or around the pitch axis impossible has occurred in the sensor 19 or 20. In this case, the microcomputer 11 calculates the angular speed Pitch_Acc around the pitch axis based on the acceleration AccX along the X-axis and the acceleration AccY along the Y-axis indicated by the X-axis acceleration information and the Y-axis acceleration information, respectively, output from the sensor 21, and the acceleration AccZ along the Z-axis indicated by the Z-axis acceleration information output from the sensor 19. Then, the microcomputer 11 compares a difference value between the angular speed Pitch_0 around the pitch axis and the angular speed Pitch_Acc around the pitch axis with a difference value between the angular speed Pitch_1 around the pitch axis and the angular speed Pitch_Acc around the pitch axis, and thereby determines whether or not the difference value between the angular speed Pitch_1 and the angular speed Pitch_Acc is greater than the difference value between the angular speed Pitch_0 and the angular speed Pitch_Acc (S11).

When the difference value between the angular speed Pitch_1 and the angular speed Pitch_Acc is greater than the difference value between the angular speed Pitch_0 and the angular speed Pitch_Acc (S11: Yes), it is determined that a failure that makes the correct detection of the angular speed around the pitch axis impossible has occurred in the sensor 21 of the 2-series system 200 (S12).

In this case, the microcomputer 11 puts a predetermined safety function(s) according to the abnormality relating to the angular speed detection in the 2-series system 200 in motion. For example, the microcomputer 11 controls the inverted two-wheeled vehicle 1 so that the inverted two-wheeled vehicle 1 is stopped as described above while maintaining the inverted state of the inverted two-wheeled vehicle 1 based on the angular speed Pitch_0 around the pitch axis obtained in the above-described manner. Specifically, the microcomputer 11 generates a command value(s) and outputs the generated command value(s) to the inverters 13 and 14 so that the inverted two-wheeled vehicle 1 is stopped. Further, the microcomputer 11 may cut off the output from the inverters 15 and 16 of the 2-series system 200 to the motors 17 and 18. This operation is implemented by disposing a relay circuit(s) between the inverters 15 and 16 and the motors 17 and 18 and outputting a signal for disconnecting the connection between the inverters 15 and 16 and the motors 17 and 18 to the relay circuit(s). Alternatively, the microcomputer 11 may output a signal for notifying a sensor failure to the microcomputer 12, and the microcomputer 12 may prevent the control of the motors 17 and 18 performed by the 2-series system 200 in response to that signal by, for example, outputting a signal to the relay circuit as described above. Further, according to this configuration, when it is conclusively determined that one of the systems has failed, the inversion control can be continued by the other system without stopping the inverted two-wheeled vehicle 1 immediately.

When the difference value between the Pitch_1 and the angular speed Pitch_Acc is not greater than the difference value between the angular speed Pitch_0 and the angular speed Pitch_Acc (S11: No), it is determined that a failure that makes the correct detection of the angular speed around the axis inclined from the pitch axis by 45° impossible has occurred in the sensor 19 or 20 of the 1-series system 100 (S13).

In this case, the microcomputer 12 puts a predetermined safety function(s) according to the abnormality relating to the angular speed detection in the 1-series system 100 in motion. For example, the microcomputer 12 controls the inverted two-wheeled vehicle 1 so that the inverted two-wheeled vehicle 1 is stopped as described above while maintaining the inverted state of the inverted two-wheeled vehicle 1 based on the angular speed Pitch_1 around the pitch axis obtained in the above-described manner. Specifically, the microcomputer 11 may output a signal for notifying a sensor failure to the microcomputer 12. In response to that signal, the microcomputer 12 generates a command value(s) and outputs the generated command value(s) to the inverters 15 and 16 so that the inverted two-wheeled vehicle 1 is stopped. Further, the microcomputer 12 may cut off the output from the inverters 13 and 14 of the 1-series system 100 to the motors 17 and 18. This operation is implemented by disposing a relay circuit(s) between the inverters 13 and 14 and the motors 17 and 18 and outputting a signal for disconnecting the connection between the inverters 13 and 14 and the motors 17 and 18 to the relay circuit(s). Alternatively, the microcomputer 11 may prevent the control of the motors 17 and 18 performed by the 1-series system 100 by, for example, outputting a signal to the relay circuit as described above. Further, according to this configuration, when it is conclusively determined that one of the systems has failed, the inversion control can be continued by the other system without stopping the inverted two-wheeled vehicle 1 immediately.

Figure 7:
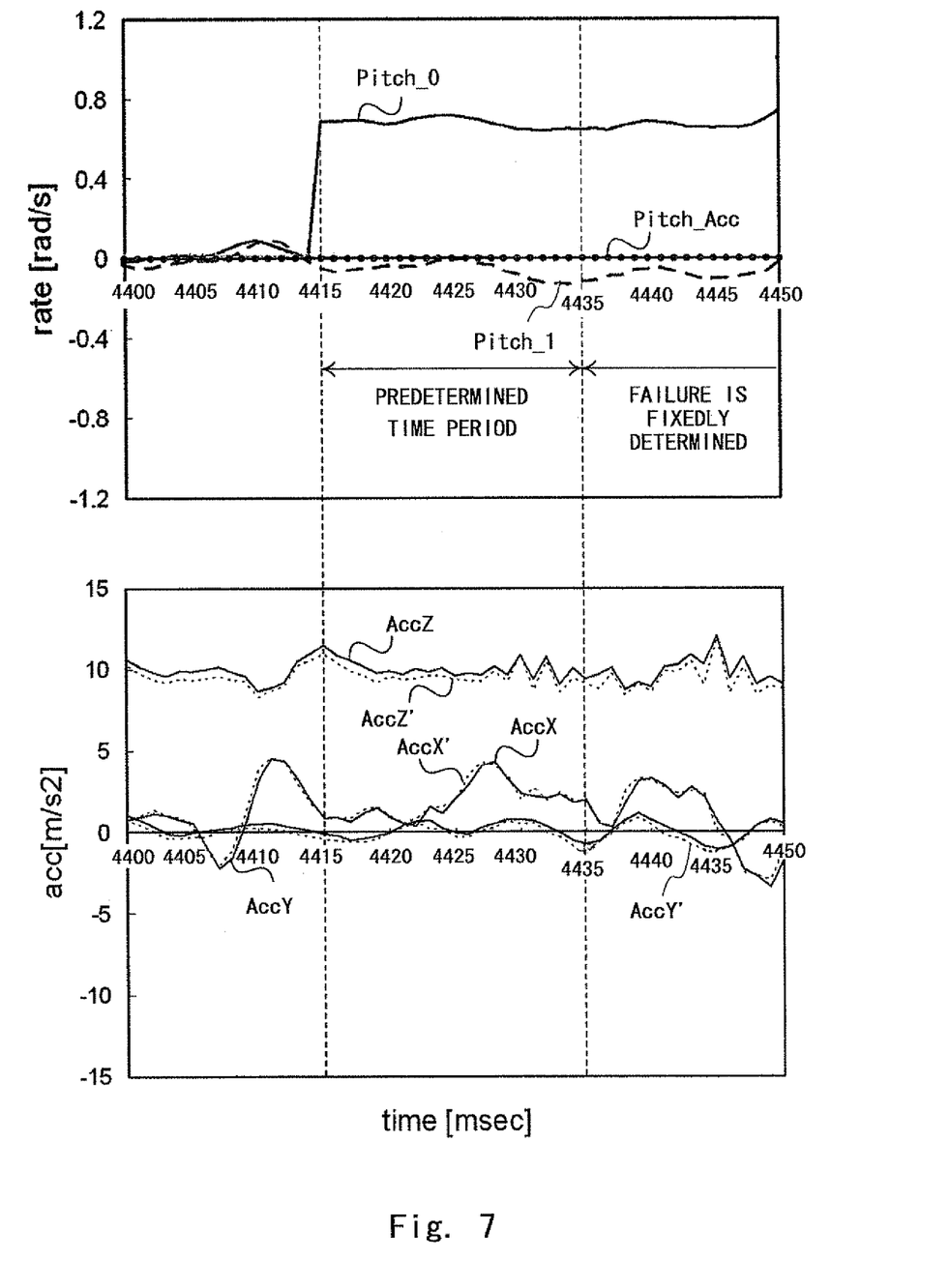
FIG. 7 shows an example of transitions of an acceleration and an angular speed according to an exemplary embodiment.

Note that in the above-described process, the determination in the step S12 or the step S13 may be conclusively determined by one determination process. Alternatively, the determination may be conclusively determined when the same determination is successively made for a predetermine time period. For example, assume that a failure that makes the correct detection of the angular speed around the axis inclined from the pitch axis by 45° impossible has occurred in the sensor 19 or 20 and thus the angular speed Pitch_0 around the pitch axis calculated based on the angular speeds ω0 and ω1 detected by the sensors 19 and 20 respectively becomes greater than the normal value (at 4415 [msec] in FIG. 7). In this case, the determination in the step S13 is made. Then, assuming that the predetermined time period is 20 msec, when the determination in the step S13 is successively made for 20 msec (at 4435 [msec] in FIG. 7), the determination in the step S13 is conclusively determined.

Note that when it is desired, after the conclusive determination in the step S13, to further determine which of the sensors 19 and 20 has failed, the microcomputer 11 may perform rotating matrix calculation for the angular speed ω2 around the pitch axis, calculate respective components of the angular speed around the two axes inclined from the pitch axis by 45°, compare the calculated angular speeds with the angular speeds ω0 and ω1 respectively, and identify the sensor that has detected the angular speed ω0 or ω1 for which the difference in the comparison is greater than that for the other as the failed sensor.

As explained above, according to this exemplary embodiment, each of the angular speeds around the pitch axis and the roll axis can be obtained by combining angular speeds detected by two sensors 19 and 20 arranged in a "truncated chevron configuration". Further, a sensor failure and a failed sensor can be detected by a comparison(s) using an angular speed around the pitch axis detected by another sensor 22. As a result, it is possible to achieve an equivalent failure diagnosis capability to that of a system including three sensors each of which detects an angular speed while using the pitch axis as the detection axis. Further, it is possible to detect an angular speed around the roll axis. That is, the need for the sensor that detects an angular speed while using the roll axis as the detection axis is eliminated, and thus making it possible to reduce the cost.

However, when an angular speed is multiplied by a rotating matrix, the resolving power of the obtained angular speed deteriorates. For example, in the above-described example, since the angular speed detection angle is inclined by 45°, the angular speed around the pitch axis obtained therefrom is 0.7 times as large as the detected value. Therefore, there are cases where a small change could be measured as a large change. Therefore, there is a problem that, when this fact is not taken into consideration, the comparison verification is performed by using angular speeds having different resolving powers, and thus deteriorating the failure detection accuracy.

To cope with this problem, in this exemplary embodiment, an abnormality (failure) in a sensor is diagnosed based on a mutual relation among an angular speed around the pitch axis calculated based on angular speeds detected by the sensors 19 and 20 respectively, an angular speed around the pitch axis detected by the sensor 22, and an angular speed around the pitch axis calculated based on accelerations detected by the sensors 19 and 20 respectively. According to this configuration, it is further determined which of the sensor 19 or 20 in the 1-series system and the sensor 22 of the 2-series system has failed by also performing a comparison verification using an angular speed calculated from an acceleration for which the resolving power is not lowered. Therefore, it is possible to identify a failed sensor without lowering the accuracy. That is, according to this exemplary embodiment, it is possible to reduce the cost without lowering the failure detection accuracy.

Further, in this exemplary embodiment, one of the sensors 19, 20 and 22, i.e., the sensor 22 is disposed so as to detect an angular speed while using the pitch axis as the detection axis. Therefore, it is possible to detect an angular speed around the pitch axis without performing rotating matrix calculation for the sensor 22. As a result, it is possible to simplify the process and thereby reduce the processing time.

Note that the present invention is not limited to the above-described exemplary embodiments, and those exemplary embodiments can be modified as appropriate without departing from the spirit and scope of the present invention.

Although examples in which the object to be controlled is an inverted two-wheeled vehicle are explained in the above-described exemplary embodiments, the number of wheels is not limited to this configuration. Note that, needless to say, when the number of wheels changes, the numbers of components (inverters and motors) corresponding to the wheels also changes.

Although examples in which the detection axes of the sensors 19 and 20 are mutually inclined in different directions with respect to the pitch axis by the same angle (45°) are explained in the above-described exemplary embodiments, the angle is not limited to this angle. For example, the angle may be an angle other than 45°. Further, detection axes of the sensors 19 and 20 may be inclined from the pitch axis by mutually different angles. In this case, the pitch-axis component and the roll-axis component may be extracted by performing rotating matrix calculation according to their angles.

Although examples in which the acceleration AccZ_0 along the Z-axis detected by the sensor 19 is defined as the acceleration AccZ along the Z-axis are explained in the above-described exemplary embodiments, the acceleration AccZ'_0 along the Z-axis detected by the sensor 20 may be defined as the acceleration AccZ. In this case, in the step S6, the acceleration AccZ along the Z-axis indicated by Z-axis acceleration information output from the sensor 20 may be compared with the acceleration AccZ_0 along the Z-axis indicated by Z-axis acceleration information output from the sensor 19.

In the above-described exemplary embodiments, examples in which an abnormality diagnosis explained in the steps S9 and S11 is performed as sensor failure detection relating to angular speed detection are explained. However, the present invention is not limited to this sensor abnormality diagnosis, provided that the sensor abnormality diagnosis is performed based on a mutual relation among the angular speed Pitch_0 based on angular speeds detected by the sensors 19 and 20, the angular speed Pitch_1 detected by the sensor 22, and the angular speed Pitch_Acc based on accelerations detected by the sensors 19 and 20. For example, majority-rule comparisons in which whether two of the angular speeds Pitch_0, Pitch_1 and Pitch_Acc coincide with each other within a predetermined range or not is determined for every possible pair may be performed.

REFERENCE SIGNS LIST

1 TWO-WHEELED VEHICLE
10 CONTROL APPARATUS
11, 12 MICROCOMPUTER
13, 14, 15, 16 INVERTER
17, 18 MOTOR
19, 20, 21, 22 SENSOR
100, 200 SYSTEM

The invention claimed is:

1. An inverted vehicle for which inversion control is performed, comprising:
   a first sensor that detects an angular speed around an axis inclined from a pitch axis of the inverted vehicle by a first predetermined angle on a plane perpendicular to a yaw axis of the inverted vehicle;
   a second sensor that detects an angular speed around an axis inclined from the pitch axis of the inverted vehicle by a second predetermined angle on the plane perpendicular to the yaw axis of the inverted vehicle;
   a third sensor that detects an angular speed around the pitch axis of the inverted vehicle;
   a pitch-axis acceleration detection unit that detects an acceleration along the pitch axis of the inverted vehicle;
   a roll-axis acceleration detection unit that detects an acceleration along a roll axis of the inverted vehicle;
   a yaw-axis acceleration detection unit that detects an acceleration along the yaw axis of the inverted vehicle; and
   a control unit that performs the inversion control based on the angular speeds detected by the first sensor, the second sensor, and the third sensor respectively, wherein
   the control unit puts a specific safety function in motion based on a mutual relation among a first angular speed around the pitch axis of the inverted vehicle calculated based on the angular speeds detected by the first sensor and the second sensor respectively, a second angular speed around the pitch axis of the inverted vehicle detected by the third sensor, and a third angular speed around the pitch axis of the inverted vehicle calculated based on the accelerations detected by the pitch-axis acceleration detection unit, the roll-axis acceleration detection unit, the yaw-axis acceleration detection unit respectively.

2. The inverted vehicle according to claim 1, wherein
   the control unit comprises a first control unit that performs the inversion control based on the angular speeds detected by the first sensor and the second sensor respectively, and a second control unit that performs the inversion control based on the angular speed detected by the third sensor,
   when the control unit determines that the third sensor is in an abnormal condition, the control unit performs the inversion control of the inverted vehicle by using the first control unit among the first and second control units, and
   when the control unit determines that the first or second sensor is in an abnormal condition, the control unit performs the inversion control of the inverted vehicle by using the second control unit among the first and second control units.

3. The inverted vehicle according to claim 2, wherein
   when the first angular speed does not coincide with the second angular speed within a predetermined range, the control unit compares a first difference value with a second difference value, the first difference value being a difference value between the first angular speed and the third angular speed, the second difference value being a difference value between the second angular speed and the third angular speed,
   when the second difference value is greater than the first difference value, the control unit determines that the third sensor is in an abnormal condition, and
   when the second difference value is not greater than the first difference value, the control unit determines that the first or second sensor is in an abnormal condition.

4. The inverted vehicle according to claim 3, wherein when, for a predetermined time period, the first angular speed does not coincide with the second angular speed within the predetermined range and the first difference value successively coincides with the second difference value in the comparison, the control unit determines that the first or second sensor, or the third sensor is in an abnormal condition.

5. The inverted vehicle according to claim 1, wherein the safety function is a braking function for stopping the inverted vehicle.

6. The inverted vehicle according to claim 1, wherein
   the first sensor further detects an acceleration along an axis inclined from the pitch axis of the inverted vehicle by the second predetermined angle,
   the second sensor further detects an acceleration along an axis inclined from the pitch axis of the inverted vehicle by the first predetermined angle,
   the inverted vehicle comprises a first yaw-axis acceleration detection unit as the yaw-axis acceleration detection unit and further comprises a second yaw-axis acceleration detection unit that detects an acceleration along the yaw axis of the inverted vehicle,
   the control unit:
   compares an acceleration along the pitch axis of the inverted vehicle calculated based on accelerations detected by the first sensor and the second sensor respectively with an acceleration along the pitch axis of the inverted vehicle detected by the pitch-axis acceleration detection unit;
   compares an acceleration along the roll axis of the inverted vehicle calculated based on accelerations detected by the first sensor and the second sensor respectively with an acceleration along the roll axis of the inverted vehicle detected by the roll-axis acceleration detection unit;
   compares an acceleration along the yaw axis of the inverted vehicle detected by the first yaw-axis acceleration detection unit with an acceleration along the yaw axis of the inverted vehicle detected by the second yaw-axis acceleration detection unit; and puts the safety function in motion based on these comparison results.

7. The inverted vehicle according to claim 6, wherein
the first sensor comprises the first yaw-axis acceleration detection unit,
the second sensor comprises the second yaw-axis acceleration detection unit, and
the inverted vehicle comprises a fourth sensor comprising the pitch-axis acceleration detection unit and the roll-axis acceleration detection unit.

8. The inverted vehicle according to claim 1, wherein the first and second predetermined angles are angles that are mutually inclined with respect to the pitch axis in different directions by the same angle.

9. A control method according to a second aspect of the present invention is a control method for performing inversion control based on angular speeds detected by a first sensor, a second sensor, and a third sensor respectively, the first sensor being configured to detect an angular speed around an axis inclined from a pitch axis of an inverted vehicle by a first predetermined angle on a plane perpendicular to a yaw axis of the inverted vehicle, the second sensor being configured to detect an angular speed around an axis inclined from the pitch axis of the inverted vehicle by a second predetermined angle on the plane perpendicular to the yaw axis of the inverted vehicle, and the third sensor being configured to detect an angular speed around the pitch axis of the inverted vehicle, the control method comprising:

detecting an acceleration along the pitch axis of the inverted vehicle, an acceleration along a roll axis of the inverted vehicle, and an acceleration along the yaw axis of the inverted vehicle; and putting a specific safety function in motion based on a mutual relation among a first angular speed around the pitch axis of the inverted vehicle calculated based on the angular speeds detected by the first sensor and the second sensor respectively, a second angular speed around the pitch axis of the inverted vehicle detected by the third sensor, and a third angular speed around the pitch axis of the inverted vehicle calculated based on the detected accelerations along the pitch axis, the roll axis, and the yaw axis, respectively, of the inverted vehicle.

* * * * *